US011610445B2

(12) United States Patent
McCombs et al.

(10) Patent No.: US 11,610,445 B2
(45) Date of Patent: Mar. 21, 2023

(54) AUTOMATIC DISTRIBUTION OF ACCESS CONTROL CREDENTIALS BASED ON A TASK

(71) Applicant: Binway, LLC, Chicago, IL (US)

(72) Inventors: Adam McCombs, Elmhurst, IL (US); Alex Samoylovich, Chicago, IL (US); David Elkind, Riverwoods, IL (US)

(*) Notice: Subject to any disclaimer, the term of this patent is extended or adjusted under 35 U.S.C. 154(b) by 0 days.

(21) Appl. No.: 16/979,441

(22) PCT Filed: Apr. 2, 2019

(86) PCT No.: PCT/IB2019/052706
§ 371 (c)(1),
(2) Date: Sep. 9, 2020

(87) PCT Pub. No.: WO2019/193502
PCT Pub. Date: Oct. 10, 2019

(65) Prior Publication Data
US 2021/0005038 A1 Jan. 7, 2021

Related U.S. Application Data

(60) Provisional application No. 62/651,325, filed on Apr. 2, 2018.

(51) Int. Cl.
G07C 9/27 (2020.01)
G07C 9/21 (2020.01)
G07C 9/29 (2020.01)

(52) U.S. Cl.
CPC .............. *G07C 9/27* (2020.01); *G07C 9/21* (2020.01); *G07C 9/29* (2020.01); *G07C 2209/02* (2013.01); *G07C 2209/08* (2013.01)

(58) Field of Classification Search
CPC ... G07C 9/27; G07C 9/21; G07C 9/29; G07C 2209/02; G07C 2209/08
See application file for complete search history.

(56) References Cited

U.S. PATENT DOCUMENTS

| 6,344,796 | B1 | 2/2002 | Ogilvie et al. |
| 6,772,130 | B1 | 8/2004 | Karbowski et al. |
| 7,139,721 | B2 | 11/2006 | Borders et al. |
| 7,222,241 | B2 | 5/2007 | Milgramm et al. |

(Continued)

FOREIGN PATENT DOCUMENTS

WO 2014134673 A1 9/2014

OTHER PUBLICATIONS

International Search Report and Written Opinion of the International Searching Authority, PCT/IB2019/052706, dated Jul. 10, 2019, 7 pgs.

*Primary Examiner* — Nabil H Syed
(74) *Attorney, Agent, or Firm* — Carlson, Caspers, Vandenburgh & Lindquist P.A.

(57) ABSTRACT

A method for managing a plurality of access control devices is provided. The method includes at a backend server, receiving a request to schedule a first task of the at least a subset of tasks. The backend server identifies one or more access control devices that a non-occupant account is to be granted credentials in order to complete the task. The backend server then provisions credentials for the one or more access control devices associated with the first task to the non-occupant account selected to complete the task.

14 Claims, 6 Drawing Sheets

(56) References Cited

U.S. PATENT DOCUMENTS

| | | |
|---|---|---|
| 7,349,854 B2 | 3/2008 | Frederick |
| 7,437,305 B1 | 10/2008 | Kantarjiev et al. |
| 7,647,231 B2 | 1/2010 | Kuebert et al. |
| 7,657,466 B2 | 2/2010 | Klingenberg et al. |
| 7,765,131 B2 | 7/2010 | Klingenberg et al. |
| 7,945,032 B2 | 5/2011 | Elberbaum |
| 7,949,557 B2 | 5/2011 | Fitzgerald et al. |
| 8,126,784 B1 | 2/2012 | Agarwal |
| 8,180,661 B2 | 5/2012 | Thielges et al. |
| 8,271,321 B1 | 9/2012 | Kestenbaum |
| 8,489,472 B2 | 7/2013 | Boitet et al. |
| 8,698,596 B2 | 4/2014 | Rudduck et al. |
| 8,832,205 B2 | 9/2014 | Nelson et al. |
| 8,844,010 B2 | 9/2014 | Brady et al. |
| 9,412,280 B1 | 8/2016 | Zwillinger et al. |
| 9,563,915 B2 | 2/2017 | Brady et al. |
| 9,632,671 B2 | 4/2017 | Albright |
| 9,641,474 B2 | 5/2017 | Brady et al. |
| 9,659,422 B2 | 5/2017 | Lovelock et al. |
| 9,666,000 B1 * | 5/2017 | Schoenfelder ..... G07C 9/00309 |
| 9,800,737 B2 | 10/2017 | Gaspard et al. |
| 10,304,273 B2 | 5/2019 | Johnson et al. |
| 10,573,106 B1 * | 2/2020 | Brady ................ G06K 9/00771 |
| 2005/0060164 A1 | 3/2005 | Illion |
| 2005/0144028 A1 | 6/2005 | Donahue et al. |
| 2012/0222103 A1 | 8/2012 | Bliding et al. |
| 2012/0254321 A1 | 10/2012 | Lindsay et al. |
| 2013/0200994 A1 | 8/2013 | Kannan |
| 2014/0114621 A1 | 4/2014 | Brigandi et al. |
| 2014/0247111 A1 | 9/2014 | Elfström et al. |
| 2014/0279655 A1 | 9/2014 | Ganesh et al. |
| 2015/0106261 A1 | 4/2015 | Shmulevsky et al. |
| 2015/0106293 A1 | 4/2015 | Robinson et al. |
| 2015/0145643 A1 | 5/2015 | Fadell et al. |
| 2015/0186840 A1 | 7/2015 | Torres et al. |
| 2016/0122157 A1 | 5/2016 | Keser |
| 2016/0358397 A1 | 12/2016 | Kristensen et al. |
| 2017/0091845 A1 | 3/2017 | Robinson et al. |
| 2018/0350223 A1 * | 12/2018 | Banczak ............. G08B 21/182 |
| 2019/0095835 A1 * | 3/2019 | Jarvis ............... G06Q 10/06313 |
| 2019/0213817 A1 * | 7/2019 | Wechsler ........... G07C 9/00817 |

* cited by examiner

AUTOMATIC DISTRIBUTION OF ACCESS CONTROL CREDENTIALS BASED ON A TASK

RELATED APPLICATIONS

This application is a national stage application, filed under 35 U.S.C. 371, of International Patent Application No. PCT/IB2019/052706, filed on Apr. 2, 2019, entitled "AUTOMATIC DISTRIBUTION OF ACCESS CONTROL CREDENTIALS BASED ON A TASK", which claims the benefit of U.S. Provisional Application No. 62/651,325, filed Apr. 2, 2018, entitled "RUNNER SYSTEM FOR A MULTI-UNIT BUILDING", the contents of which are hereby incorporated herein by reference.

BACKGROUND

Electronically controlled access control devices (e.g., smart locks) for buildings are becoming more and more common. Some of these devices allow an individual to unlock them without a physical key (e.g., traditional key or key card). For example, some of these devices can be unlocked with a code (e.g., via a keypad or the like). Others can be unlocked via an image (e.g., QR code) or signal (e.g., Bluetooth) from a cell phone.

Since these electronically controlled access control devices do not require a physical key, access credentials can more easily be sent to individuals requiring access. Typical processes for providing access through these devices, however, requires manually granting access for an individual to each separate access control device. For example, for an occupant in a multi-unit building to provide access to their unit for a guest, the occupant must manually individually provide access through an exterior door, to the correct floor in an elevator, and to their occupant unit.

BRIEF DESCRIPTION

Embodiments for a method, program product, and device for managing a plurality of access control devices are provided. The embodiments include providing a plurality of tasks that can be selected by an occupant or a manager of a multi-unit building. Each of at least a subset of the plurality of tasks associated with one or more non-occupant accounts that can be selected by the occupant or manager to complete the corresponding task. Each of at least a subset of the plurality of tasks is associated with one or more of the plurality of access control devices that the one or more third parties can be granted access to in order to complete corresponding task. A backend server receives a request to schedule a first task of the at least a subset of tasks. The backend server identifies one or more access control devices that a non-occupant account is to be granted credentials in order to complete the task. The backend server provisions credentials for the one or more access control devices associated with the first task to the non-occupant account selected to complete the task.

DRAWINGS

Understanding that the drawings depict only exemplary embodiments and are not therefore to be considered limiting in scope, the exemplary embodiments will be described with additional specificity and detail through the use of the accompanying drawings, in which.

DESCRIPTION

Figure 1:
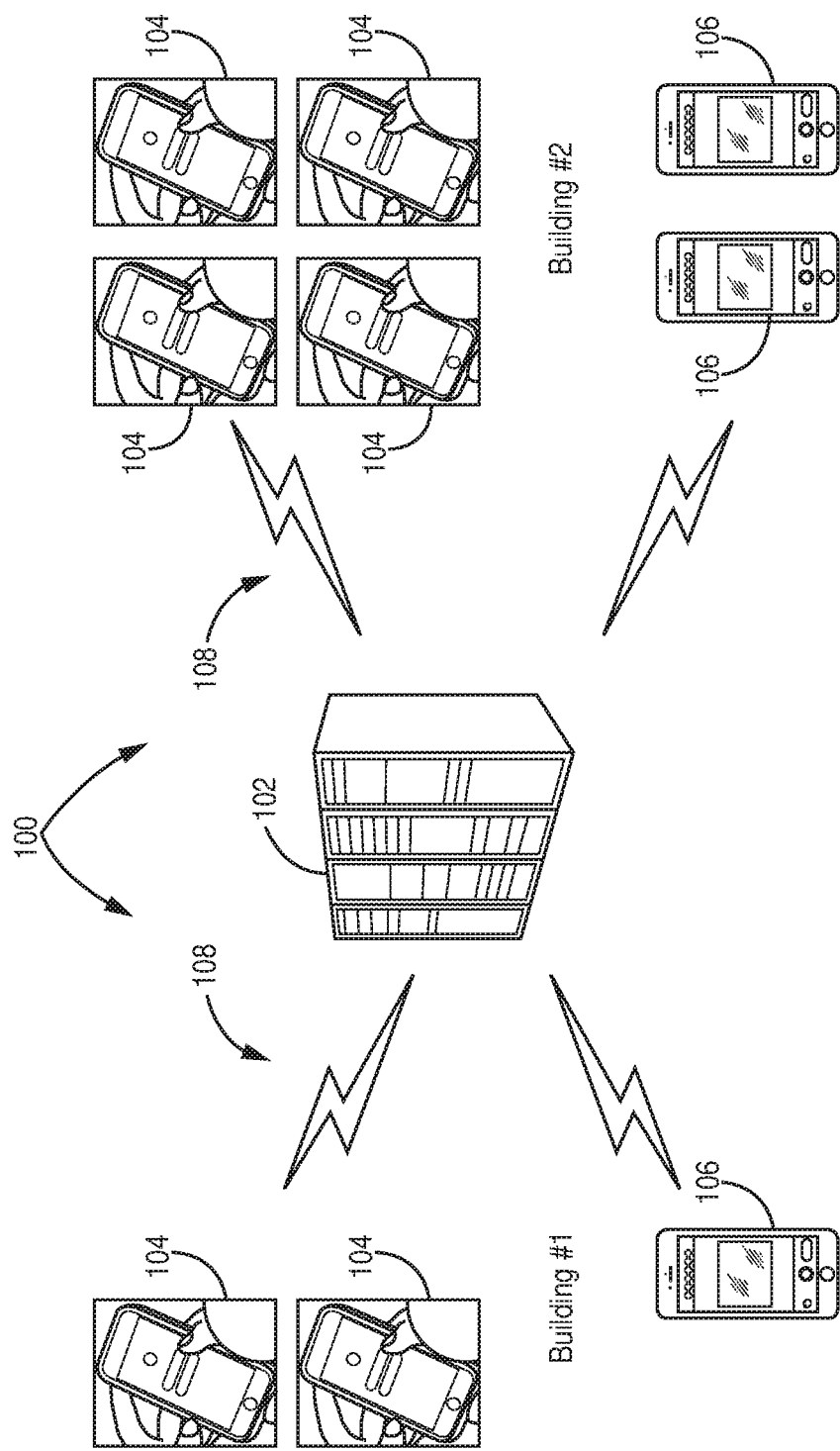
FIG. 1 is a block diagram of an example system that provides services to occupants and management for a multi-unit building.

FIG. 1 is a depiction of an example system 100 that provides multiple services for a multi-unit building. One feature that system 100 provides is automatic distribution of access control credentials. Based on known information regarding an occupant (tenant or owner) of a unit and access control devices, as well as pre-configured tasks, system 100 can automatically distribute electronic credentials to non-occupant individuals providing the non-occupant individuals the access through access control devices necessary to complete a task for an occupant or management of the multi-unit family or commercial building. System 100 can also provide other features for occupant and management as discussed below. In an example, in addition to automatic distribution of access control credentials, system 100 can provide efficient item pickup, delivery, and management for one or more multi-unit buildings.

The system 100 includes a backend server (e.g., web server) 102 communicatively coupled to a plurality of occupant apps 104, one or more runner apps 106 and one or more management apps (not shown). The backend server 102 can be communicatively coupled to the plurality of occupant apps 104, one or more runner apps 106, and one or more management apps over one or more networks 108, including, but not limited to, a local area network, intranet, and/or the internet. Communication between the backend server 102, the occupant apps 104, the runner apps 106, and backend server apps can use any appropriate protocol including Internet Protocol (IP), Hypertext Transfer Protocol (HTTP), Hypertext Transfer Protocol Secure (HTTPS), and other internet-based protocols. The occupant apps 104 interact with occupants of the multi-unit family or commercial building(s), the runner app(s) 106 interact with one or more runners and the management app interacts with a management individual for the building.

A runner is an individual that manages transport of items to and from occupant units. The runner can be employed by the building owner or management of the building, for example. A runner can pick-up items destined for occupant units, for example, from a shipping company, and deliver the items to the appropriate occupant units. The runner(s) can also pick-up items outgoing from the occupant units and deliver them to the front desk or other appropriate area for pick-up by a shipping company. The runner(s) can also take care of tasks for management of the building. The runner(s) can receive, stage, and deliver the items, taking the responsibility so that building management can focus on other activities. Items transported by the runner(s) can include packages to/from a shipping company (e.g., UPS, FedEx, DHL), food delivery (e.g., ready-to-eat food from GrubHub or the like, groceries), and other items.

The occupant apps 104, runner app(s) 106, and management app are software modules installed on computing devices of the occupants and runner(s) respectively. The occupant apps 104 and runner app(s) 106 can execute on any appropriate computing device including, but not limited to, a desktop, laptop, tablet, mobile phone, or wearable device (e.g., a smartwatch, Google glass). The occupant apps 104, runner app(s) 106, and management app can execute within an operating system executing on the computing device. Any appropriate operating system can be used including Android, iOS, Windows, and others. The backend server 102 is a central repository for data from/for the occupant apps 104, runner app(s) 106, and management app. The backend server 102 relays information between the occupant apps 104, the runner app(s) 106, and management app(s) and provides data management and analysis for the occupant apps 104, runner 106 apps, and management app. The occupant apps 104, runner app(s) 106, and management app can receive and output information in any suitable manner including via a touch screen, keyboard, mouse, voice, sound, etc.

The runner app 106 displays one or more lists of tasks for the runner. The runner can view the one or more lists to identify task(s) to perform. In an example, the runner app 106 displays the tasks in multiple lists, each list displayed in a manner such that the list can be distinguished from the other lists. Each list can correspond to a category of tasks. One example list is the ASAP list, which is for tasks to be completed as soon as possible. Another example list is for scheduled deliveries, that is, items that are to-be-delivered within a scheduled time frame. Another example list is for deliveries to an occupant unit from a local store (e.g., within the building or nearby). Yet another example list is for overdue tasks, that is, tasks that are overdue to be completed. Any list or set of lists can be used, including any of the example lists herein and/or other lists.

The tasks for the runner can include other tasks in addition to, or instead of, delivery of items. These tasks can include taking out garbage and/or recycling for an occupant. The garbage and/or recycling task can be a recurring task to accomplish on a regular interval or on-demand in response to a request from an occupant. Runner tasks can also include delivery and retrieval of storage bins stored within the building, but external to the occupant's unit. For example, dead space within the building can be utilized to store bins that hold an occupant's stuff. The occupant can purchase a desired number of bins and store any desired items therein. The runner will transfer the bins between the occupant's unit and a storage location within the building (dead space) upon request from the occupant via the occupant app. A task can also include delivery of an item from a local store. The local store can be an online store implemented within the occupant app, and the items in the store can be stored in a storage location within the building (e.g., in dead space). The occupant app 104 can receive an indication that an occupant would like to purchase an item and provide information indicative thereof to the backend server 102. The backend server 102 can obtain payment for the item from the occupant and provide a task to the runner app 104 to deliver the purchased item to the occupant. In another example, the local store is a brick and mortar location within or nearby the building. In either case, once the item has been purchased or otherwise requested by the occupant, a task can be included for the runner to manage delivery of the item from the storage location or local store to the occupant.

The tasks can be added to the list(s) in any appropriate manner. In an example, the tasks are added to a list by the backend server 102, which pushes the lists to the runner app(s) 106. To add a task to a list, the backend server receives an indication of a new task from an occupant app 104 or a runner app 106. For example, if the runner receives an item from a shipping carrier to-be-delivered to an occupant unit, the runner can enter information about the item into the system 100 via the runner app 106. The item information can include information indicating an entity from which the item was received (e.g., UPS, FedEx, GrubHub, etc.), an occupant and/or unit to which the item is to be delivered, an indication of whether the item should be delivered ASAP, and/or other information. The runner app 106 can send an indication of the item information to the backend server 102.

In response to receiving an input of an item received, the backend server 102 can identify an occupant account associated with the item. The occupant account can be identified by matching the occupant's name and/or unit number input by the runner that received the item with the occupant's name and/or unit no. in the occupant account. The backend server 102 can then perform an action based on information in the identified occupant account. For example, if the occupant account identifies that the runner is authorized to independently unlock and enter the occupant's unit, the backend server 102 can create a task to deliver the item and add the task to the authorized entry list (discussed in more detail below). If the occupant account identifies a default preferred delivery time or window, then the backend server 102 can create a task for delivery of the item and at the default delivery time or window. The backend server 102 can also send a communication to the occupant app 104 to confirm a default delivery time and/or to request that the occupant provide a desired delivery time or window. The communication can be sent to the occupant app 104 associated with the identified occupant account. The occupant app 104 can display an indication of the communication and receive an input from the occupant indicating or confirming a desired delivery time or window. The occupant app 104 can then send an indication of the confirmed or desired delivery time or window to the backend server 102.

A task can also be created by management via the management app. Via the manager app, a manager can create tasks for the runner or others. These tasks can be any of the tasks discussed herein. For example, a manager can create a task for a runner to deliver a packet to an occupant unit. A manager can also create a task for a service entity to clean location(s) within the building.

Based on the information received from the runner app 106, the occupant app 104, or management app, the backend server 102 can create a task for the runner to deliver the item to the appropriate unit. The backend server 102 can also determine which of multiple lists to put the task in. The backend server 102 can determine which list to put the task in based on the information entered by the runner and/or information provided by an occupant associated with the item. If the information input into the runner 106 or occupant 104 app indicates that delivery is to be ASAP, the backend server 102 can add the task to the ASAP list. If a desired delivery time or window (e.g., a default or one-time input by occupant) is available, the backend server 102 can add a task to the scheduled delivery list, wherein the task is to deliver the item to the occupant unit at the desired delivery time or window.

Similar tasks can be created for other runner activities. For example, the occupant app 104 can receive an input from an occupant requesting retrieval of an occupant's storage bin from a storage location, along with a desired time/window for delivery. The occupant app 104 can send an indication of the request to the backend server 102. The backend server 102 can then create a task for the runner to retrieve the bin and deliver it to the occupant's unit. The backend server 102 can determine what list to put the task in based on the information input with the occupant's request. If the occupant's request indicates a time or window for delivery, the backend server 102 can add the task to the scheduled delivery list. If the occupant's request indicates delivery ASAP, the backend server 102 can add the task to the ASAP list. Tasks for delivery of products from local stores can also be similarly added to the runner's lists. Also, recurring tasks can be added to the runner's lists, such as a recurring task for taking out the garbage from a particular occupant unit every Thursday morning.

A runner can view the tasks in the one or more lists through the runner app 106. The runner app 106 can receive an input from the runner indicating that the runner is claiming a task to complete and/or has completed a task. In an example, a runner can select a task from the one or more lists and then select a claim button or a completed button in the runner app 106 to input that the task is to-be or has been completed by the runner. In response to receiving an input that a task is completed, the backend server 102 can remove the task from the one or more lists, such that it is no longer displayed in the runner app 106 for the runner. In an example, the runner app 106 can also receive an input from a runner indicating that an item is, or will be, staged in a temporary storage location to-be-delivered at a later time (e.g., during a later scheduled delivery window). The runner app 106 can receive an input from the runner indicating the location in which the item is stored (e.g., temp storage location #2). The runner app 106 can receive the information and send it to the backend server 102, which can associate the information with the task corresponding to that item. The backend server 102 can also push the information out to the runner app(s) 106, so that the runner app(s) 106 can display an indication that the item is located in the temporary storage location. Thus, when a runner goes to complete that task at a later time, the task can indicate to the runner the item is stored in temp storage location #2, and the runner can go to that location to pick up the item.

The backend server 102 can also accommodate multiple runners accessing the same set of tasks. In an example, the same one or more lists can be shown on multiple runner's respective runner app 106. When a first runner claims a first task via input to their runner app 106, the backend server 102 can indicate on the other runner's apps that the first task has been claimed by the first runner. Thus, the other runners can be aware that the first task is being handled by the first runner, so the other runners will choose other tasks to complete. Once a task is marked as completed by a runner, the task can be removed from all the runner apps 106 by the backend server 102.

As discussed above, the runner app 106 can receive inputs from a runner. The inputs can include information regarding an item. This information can include, but is not limited to any of the following indications: an item has been received by a runner, an item's location (e.g., front desk, temp storage room #2, deadspace room #5), a courier for the item, a type of item (e.g., food delivery, whether the item is perishable, courier package, occupant storage bin), a size, a weight, destination, origination, etc. In an example, information can be entered into the runner app via a touch screen keyboard or other text input mechanism. Information entered into the runner app can be passed by the runner app to the backend server for data storage and association with the appropriate item, task, and/or occupant unit.

In an example, the runner app(s) 106, occupant app(s) 104, management app, and/or backend server 102 can automatically determine one or more items of information to associate with an item, task, and/or occupant unit based on an input received at a runner app 106 or occupant app 104. The runner app 106 or occupant app 104 can receive input from a scan of a bar code or address label of an item and pass an indication of the input to the backend server 102. In an example, the backend server 102 can identify information from the bar code or address label. For example, the backend server 102 can identify an entity to which a bar code corresponds (e.g., UPS) and decode the bar code using rules that correspond to the entity. Thus, for example, if a package is received that has a UPS bar code, the backend server 102 can identify the bar code as corresponding to UPS and use UPS rules to decode the bar code. By decoding the bar code, the backend server 102 can identify a destination for the package and can then associate information regarding the package with the occupant unit that is the destination. In addition to, or instead of, decoding a bar code, the backend server 102 can read text on an address label with optical character recognition to identify information such as a destination for the item.

As mentioned above, the occupant app 104 can receive inputs from the occupant and the management app can receive inputs from a manager requesting an action be taken by a runner. The requested actions of the runner can include pick-up of an outgoing item, garbage/recycling pick-up, minor maintenance repair, storage bin pick-up or delivery, and other actions. In response to receiving a request for an action, the occupant app 104 or management app can send an indication of the requested action to the backend server 102. The backend server 102 can add a task for the requested action to the runner's lists as described above.

The occupant app 104 or management app can also display a request for the occupant to input a requested delivery time or window of an item and/or bin. In response to receiving the requested delivery time or window of an item and/or bin, the occupant app 104 can send an indication of the delivery time or window to the backend server 102. In an example, the delivery time or window is not selected from a set of options presented to the occupant, instead, the occupant is allowed to input any delivery time or window they desire. The backend server 102 can then create a task for the runner app(s) 106 as described above based on the delivery time or window.

The backend server 102 manages the tasks for the building(s) by sending and receiving the communications described herein to/from the plurality occupant apps 104 and runner apps 106 associated with the building. The backend server 102 pushes out the one or more lists of tasks to the runner apps 106 and updates the one or more lists based on inputs from the runner apps 106 and occupant apps 104. The backend server 102 can also maintain an occupant account for each occupant. The occupant account can include identifying information for the occupant, such as the occupant's name, their unit number in the building, as well as any delivery preferences. Delivery preferences can include whether independent entry is authorized, default delivery time or window, whether garbage or recycling pickup is desired, and other preferences.

The backend server 102 can manage multiple sets of tasks concurrently. Each set of tasks can correspond to a set of one or more runners. Each set of tasks can include any of the tasks mentioned herein, such as package delivery, pick-up, third-party services, bin swapping, and maintenance requests. Each set of tasks can also be for one or more buildings managed by the corresponding set of one or more runners. That is, a first set of runners can manage tasks for a first building including 1000 units as well as a second, nearby building, having 20 units. In an example, a first set of runners can manage tasks for a set of buildings that include the first building and other buildings that are within a desired radius of the first building. The runner can use the first building as a central hub for running to the other nearby buildings. For example, the runner can store packages and bins for the other buildings in the first building and can deliver on-demand items stored in the first building to units in the other buildings. Packages, bins, and on-demand items can also be stored in one or more of the other buildings.

A second set of tasks managed by the backend server 102 can correspond to a second set of runners for one or more other buildings. Such that a distinct set of runners services a distinct set of one or more other buildings.

The backend server 102 can maintain each set of tasks separately and push out the list(s) of tasks for a set to the runner apps for the runner(s) corresponding to that set. The backend server 102 can also send and receive communications with occupant apps 104 in the multiple buildings and can update the appropriate set of tasks based on communications to/from occupant apps 104 and runner apps 106 associated with that set. The backend server 102 can maintain an association between each runner and the set of tasks to which that runner corresponds, and between each occupant account and the set of tasks to which that occupant corresponds. The backend server 102 can also manage the runners for a set of tasks. For example, during a time of higher demand on the runners, the backend server 102 can request activation of one or more additional runners to help accomplish a given set of tasks. The additional runners can then access their runner app 106 to claim one or more tasks to complete. In an example, the additional runners can be temporary, on-demand runners, such as an occupant in the building or a doorman for the building. Each such runner would access their own runner app 106 to view available tasks and input information as described herein.

In an example, one or more robots can assist the runner in movement of items within, around, to, or from a building. For example, a runner can load an item in, or otherwise secure the item to, a robot and provide instructions to the robot to deliver the item to a unit. Similarly, the runner can provide instructions to a robot so that the robot travels to an occupant unit to retrieve an item and brings the item back to the runner. A robot can also be instructed to place or retrieve something from a temporary storage location within the building or to place or retrieve a storage bin in or from its storage location. A robot can be any appropriate device that can autonomously transport an item. Example robots include a wheeled robot, a walking robot, a flying robot (i.e., a drone), a conveyor system (e.g., a network of conveyor belts), or a combination of multiple robots can be used. The runner can provide instructions to the robot in any suitable manner. For example, the runner can manually input information into the robot (e.g., via a user interface on the robot) to provide instructions for the robot.

In another example, the robot can be communicatively coupled to the backend server 102 or to the runner app 106 over a network (e.g., a LAN and/or the Internet) and the runner can provide instructions to the robot through the runner app 106. In an implementation of such an example, the runner app 106 can accept an input from the runner to transfer a task from their list on the runner app 106 to the robot. Upon receiving the input from the runner to transfer a task to a robot, the runner app 106 and/or backend server 102 can provide the appropriate instructions to the robot so that the robot travels to the necessary locations to accomplish the task. For example, if the runner transfers a task for delivery of an item that is currently at the front desk of the building to an occupant unit, the runner app 104 and/or backend server 102 can send instructions to the robot to travel to the front desk to obtain the item and, once the item is obtained, to travel to the occupant unit to deliver the item. Advantageously, the runner app 106 can have already received input from the runner indicating the current location of the item (the front desk), the destination of the item (the occupant unit), and the time of delivery, so that the runner app 106 and/or backend server 102 can automatically know where and when to instruct the robot without further input from the runner. That is, the runner can simply transfer the task (e.g., via selection of an appropriate button or series of buttons in the runner app), and the runner app 106 and/or backend server 102 can automatically pull information that is associated with the task (e.g., location of item, destination of item, and time of delivery) and generate instructions for the robot based on the information.

In an example, the robot can be a third-party robot with an interface to receive instructions from the backend server 102 or the runner app 106. The third-party robot can authenticate itself with the backend server 102. Once authenticated, the backend server 102 can send information identifying the third-party robot to the appropriate runner app(s) 106. The runner app(s) 106 can then display the third-party robot as an available delivery robot and the runner can transfer the task to the third-party robot. Upon transfer, the backend server 102 can send instructions to the third-party robot to perform the task as discussed above.

In an example, the runner app 106 can receive an input to transfer a task to a mobile device (e.g., mobile phone) of third-party human. This can be useful to provide directions to an individual unit within the building for a delivery person that is delivering an item to a building. In such an example, the mobile device of the third-party human can authenticate itself with the backend server 102. The mobile device of the third-party human can authenticate itself with the backend server 102. Once authenticated, the backend server 102 can send information identifying the third-party mobile device to the appropriate runner app(s) 106. The runner app(s) 106 can then display the third-party mobile device as an available delivery robot and the runner can transfer the task to the third-party mobile device. Upon transfer, the backend server 102 can send directions to the third-party mobile device to direct the third-party mobile device to the individual unit(s) to which the items are to be delivered.

The backend server 102 can also maintain tasks that correspond to non-occupants other than the runners. As used herein, a "non-occupant" is an individual or entity that is not a current occupant of a unit of a building managed by the system 100. A non-occupant can include a runner, guest of an occupant, third-party service entity (e.g., cleaning service), or individual associated with such a third-party entity. Notably, since the system 100 can manage multiple buildings and/or multiple different management accounts (each management account corresponding to a set of tasks), an occupant and a non-occupant as used herein corresponds to the management account. That is, an individual that is an occupant for building #1 which is managed by a first management entity and has a first management account in system, would be considered an occupant and have a corresponding occupant app in the system for building #1. That individual would be considered a non-occupant for building #2, however, which is managed by a second management entity and has a second management account. In any case, the backend server 102 can maintain tasks that correspond to non-occupants in addition to the tasks for runners. These tasks can include third-party services, such as cleaning of an occupant unit, or moving services. These tasks can also include guest access for a guest to the unit. These tasks can be initiated in the same manner as the tasks discussed above. That is, an occupant via their occupant app 102 can initiate a task or a manager can also initiate a task via their management app.

Authorized Entry

The system 100 can also maintain authorized entry information for non-occupants of the building. Authorized entry is the process of determining whether to provide electronic access credentials to non-occupant for an access control device of a building. The backend server 102 can maintain information to distribute the electronic access credentials to authorized non-occupants for entry through an access control device of the building.

One example is that the backend server 102 can provide electronic access credentials to runners as appropriate to complete their tasks. For example, the backend server 102 can maintain a list for the runner app 106 that is authorized entry, that is, for items to-be-delivered to a unit in which the runner is authorized to independently unlock the unit's door and deliver items inside the unit. Any appropriate access control devices can be used. For example, the backend server 102 can interact with a third-party smart lock system (e.g., from Assa Abloy) for the occupant unit to obtain a temporary key to unlock the door to the occupant unit. The temporary key can be a PIN that is manually entered by the runner, a mobile key that is transmitted from the runner's mobile device to a smart lock on the door (e.g., wirelessly transmitted), or a remote access request transmitted to the smart lock via the cloud. The temporary key can be valid only during a certain time frame.

Figure 2:
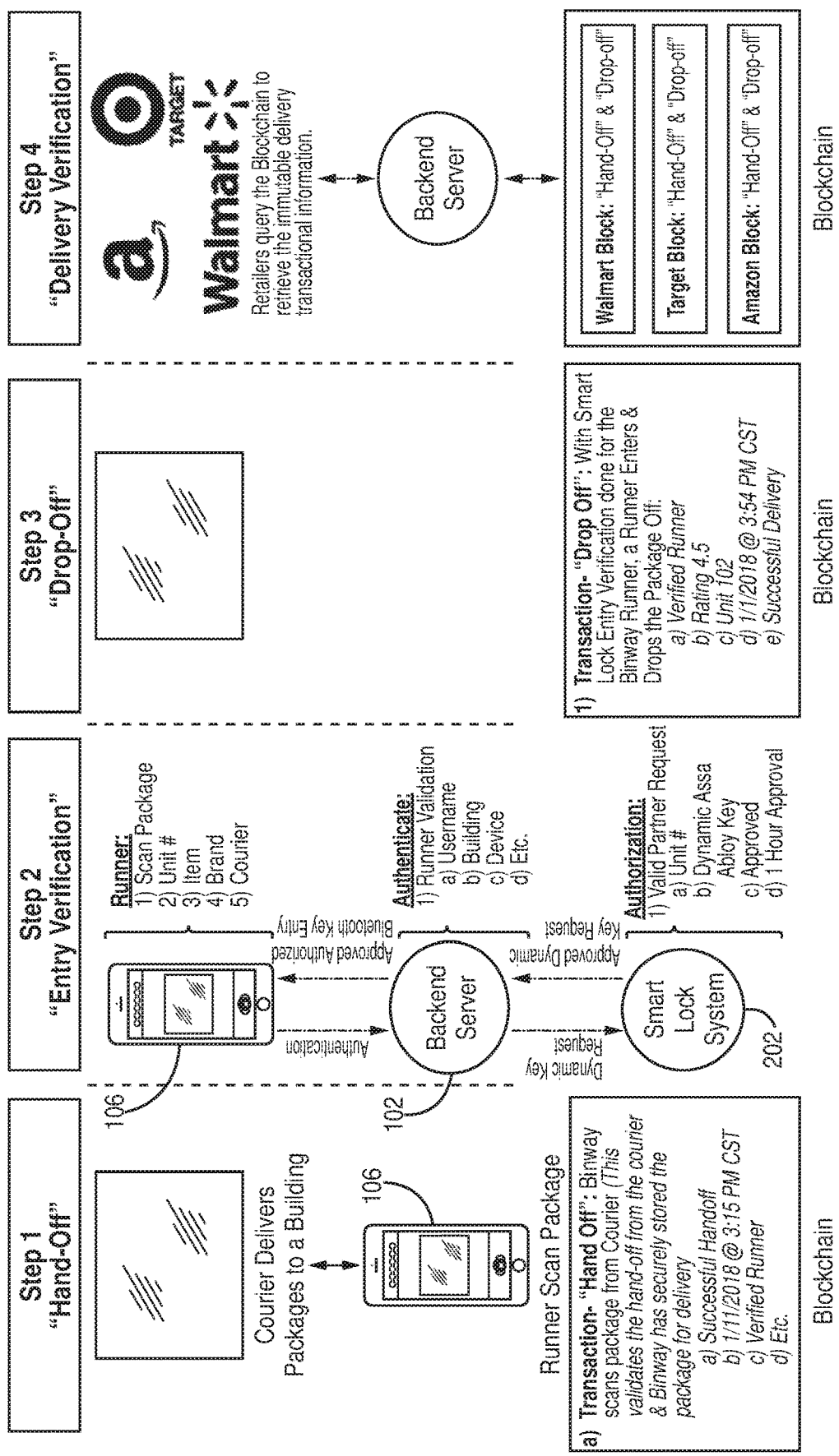
FIG. 2 is an illustration of an authorized entry process that can be used with the system of FIG. 1.

Step 2 of FIG. 2 illustrates an example process of authorized entry using a runner app 106, the backend server 102, and an access control device (e.g., smart lock system 202). The backend server 102 can determine which unit to request a temporary key for based on a task that the runner is executing. For example, if authorized entry is authorized for unit #102, the runner app 106 can receive an input from the runner requesting a temporary key for unit #102. In response to receiving the input, the runner app 106 can send a request for the temporary key along with an indication of the unit to which entry is requested, to the backend server 102. The indication of the unit can be sent to the backend server 102 in any suitable form, such as identifying the unit directly or identifying the task being completed. If an indication of the task is provided, the backend server 102 can identify the unit associated with the task via stored information associated with the task and request a temporary key from the third-party smart lock system 202 for the unit corresponding to the task. Once the backend server 102 receives the temporary key from the third-party system 202, the backend server 102 can send the temporary key to the runner app 106. The runner app 106 can then display the temporary key for the runner or provide the temporary key directly to the smart lock, depending on the type of key used.

The backend server 102 can also request and provide temporary keys for other non-occupants. For example, since the backend server 102 is a trusted entity by the smart lock system 202, the backend server 102 can obtain temporary keys from the smart lock system 202 and provide the temporary keys to a non-occupant. A non-occupant device can send a request to the backend server 102, for access to an occupant unit or other location (e.g., elevator, shared space, the building entrance) within the building. The backend server 102 can authenticate the non-occupant device and verify that the non-occupant device is authorized to enter the requested unit. To verify that the non-occupant device is authorized to enter the requested unit, the backend server 102 can verify that authorized entry into the unit has been authorized by the occupant and can also verify that the non-occupant is an entity authorized to use the authorized entry. A non-occupant can be authorized in any appropriate manner including being a priori authorized on the backend server 102.

In an alternative example, the non-occupant can be assigned a task by the backend server 102 and the non-occupant can execute a non-occupant app as part of system 100. The non-occupant app can execute on a mobile device and communicate with the backend server 102 in the same manner as the runner app 106. The non-occupant app can receive log-in information from the non-occupant, which associates the non-occupant app with a non-occupant account. The backend server 102 can maintain a plurality of non-occupant accounts and can association non-occupant account(s) with a task for authorized access. For example, during creation of a task, an occupant or manager can indicate a non-occupant account that is to be provided authorized access associated with the task. The non-occupant account can be the entity (e.g., service entity) or individual (e.g., guest) that is to complete the task (e.g., cleaning or guest access). In response to receiving the information from the occupant or management app, the backend server 102 can store an indication that that particular non-occupant account is to have authorized access for that task.

The non-occupant can then execute their non-occupant app on their mobile device, which is logged-in under their non-occupant account. Their non-occupant app can display the available tasks assigned to that non-occupant account in the same manner as the runner app 106 described above. The non-occupant can then select a task to perform. If there is authorized access corresponding to that task, the backend server 102 can identify and coordinate with the appropriate access control devices to obtain the electronic access credentials for the access control devices associated with the task. Those electronic access credential can then be sent to the non-occupant app for that non-occupant to provide to the access control devices.

In any case, once the non-occupant device is authenticated and verified, the backend server 102 can request a temporary key for the corresponding unit from the smart lock system 202, receive the temporary key from the smart lock system 202 and provide the temporary key to the non-occupant device. The backend server 102 can maintain a log of the non-occupant authorized entry requesting, including which non-occupant made the request and charge the third-parties for the service (e.g., charge a fee per authorized entry request). The backend server 102 can grant individual access to certain shared spaces within the building such as a business center, a workout center, or a bathroom. Thus, individual subscribers to a service provided by an entity managing the backend server 102 can provide their individual subscribers access to building facilities if, for example, the individual is traveling and is in the area of the building. Non-occupant access for an individual could also be provided to an occupant unit upon request of an occupant.

This could be used if the occupant would like to temporarily rent out their unit, or for a guest of the occupant, for example. In an example, an authorized entry (e.g., non-occupant) app can be provided for installation on non-occupant devices to perform communications with the backend server 102 to enable non-occupant authorized entry functions described herein.

As mentioned above, the backend server 102 can determine whether the runner app 106 or non-occupant device is authorized to obtain the temporary key before providing the temporary key thereto. In an example, authorized entry can be authorized for a given non-occupant account by an occupant or manager prior to creation of a task. That is, the backend server 102 can maintain a list of non-occupant accounts and which access control devices they are authorized access to. For example, a non-occupant account for a service entity (e.g., Wal Mart) may have been granted general authorized entry for one or more occupant units, but not for other occupant units. The general authorized entry for a unit can include general permissions (authorized entry allowed or not allowed), permissions that are based on individual or non-occupant entity (e.g., a list of non-occupant entities or individuals that are and/or are not allowed authorized entry to a unit, permissions that are based on time (e.g., authorized entry is allowed between 9:00 AM and 6:00 PM), other permissions, or a combination of the permissions. Each unit can set their own individual permissions, which are tracked by the backend server and referenced when approving an authorized entry request. If an entity is on a general authorized entry for an occupant unit or other location (e.g., shared space) within the building, backend server 102 can associate them as having authorized entry for tasks corresponding to those units or locations.

Authorized entry can also be given to a non-occupant during creation of a task. For example, an occupant or manager can select a non-occupant to associate with a task during creation of the task and can indicate via their occupant app 104 or management app whether the non-occupant is to be granted authorized entry associated with the task.

In an example, authorized entry can be authorized by an occupant on demand. That is, when a non-occupant request for authorized entry is received at the backend server 102, the backend server 102 can send an indication of the request and an indication of an entity or individual making the request, to the occupant app(s) 104 associated with the occupant unit. In response to receiving the indications from the backend server 102, the occupant app(s) 106 can prompt the occupant with the authorized entry request and an indication of the non-occupant or individual making the request to determine whether the occupant would like to grant on demand authorized entry for the non-occupant or individual. The occupant app 106 can receive a response from the occupant and provide an indication of the response to the backend server 102. If the occupant authorizes the on-demand request, the backend server 102 can request a temporary key from the smart lock system as described above. If the occupant denies the on-demand request, the backend server 102 will not request a temporary key on behalf of the non-occupant or individual and will instead send an indication to the non-occupant device that the authorized entry request is denied.

In an example, the backend server 102 can include a time frame in which the temporary key is to be valid along with a request for a temporary key sent from the backend server 102 to the smart lock system. For example, the backend server 102 can include a time frame that the temporary key is to be valid for 30 minutes from the present time. In another example, the backend server 102 can include a time frame that the temporary key is to be valid from a first time on a first date (e.g., 3 PM on March $1^{st}$) to a second time on a second data (e.g., 10 AM on March $5^{th}$). Any appropriate time frame can be requested. The time frame can be set by the backend server 102 and/or can be set on-demand by the occupant in an on-demand situation. In examples where the backend server 102 sets the time frame, time frame can be set based on universal rules governing authorized access for a party (e.g., non-occupant or runner) that is requesting access (e.g., certain parties are granted time frame A, other parties granted time frame B). The universal rules can apply to the party regardless of which occupant unit the party is entering. The time frame can also be set based on individual rules specific to the occupant unit. The individual rules can be specific to the occupant unit and to the party (e.g., a runner can enter unit #102 between 8 AM and 9 PM, while UPS can enter between 9 AM and 6 PM). If specific rules and universal rules are applicable to a situation, the specific rules can trump the universal rules. The backend server 102 can maintain the rules for each party and/or unit, reference the rules, and include the appropriate time frame with a request for a temporary key to the smart lock system. In examples where the authorized access is authorized on-demand, the occupant app 104 receiving the on-demand authorization from the occupant can also receive a time frame for the on-demand authorization. The occupant app 104 can send this time frame along with its indication of that the on-demand request is authorized to the backend server 102. The backend server 102 can then send this on-demand time frame to the smart lock system 202. Such an on-demand time frame can trump both universal and specific rules.

In an example, the occupant app 104 or runner app 106 can receive an initiation of the non-occupant authorized entry. The occupant or runner can input into the occupant app 104 or runner app 106 respectively, an identifier for a non-occupant that the occupant/runner would like to grant authorized access to the unit/location. The identifier can be a phone number, name, or other identifier for the non-occupant. The initiation received by the occupant app 104 or runner app 106 can also include a time frame for the authorized entry as discussed above. In response to receiving the input, the occupant app 104 or runner app 106 can send the identifier and time frame to the backend server 102. The backend server 102 can then send a prompt to the non-occupant associated with the identifier. The prompt can prompt the non-occupant to download the non-occupant app or take other action to properly request entry into the unit/location. The non-occupant can then request authorized entry into the unit/location as discussed above.

Figure 3A:
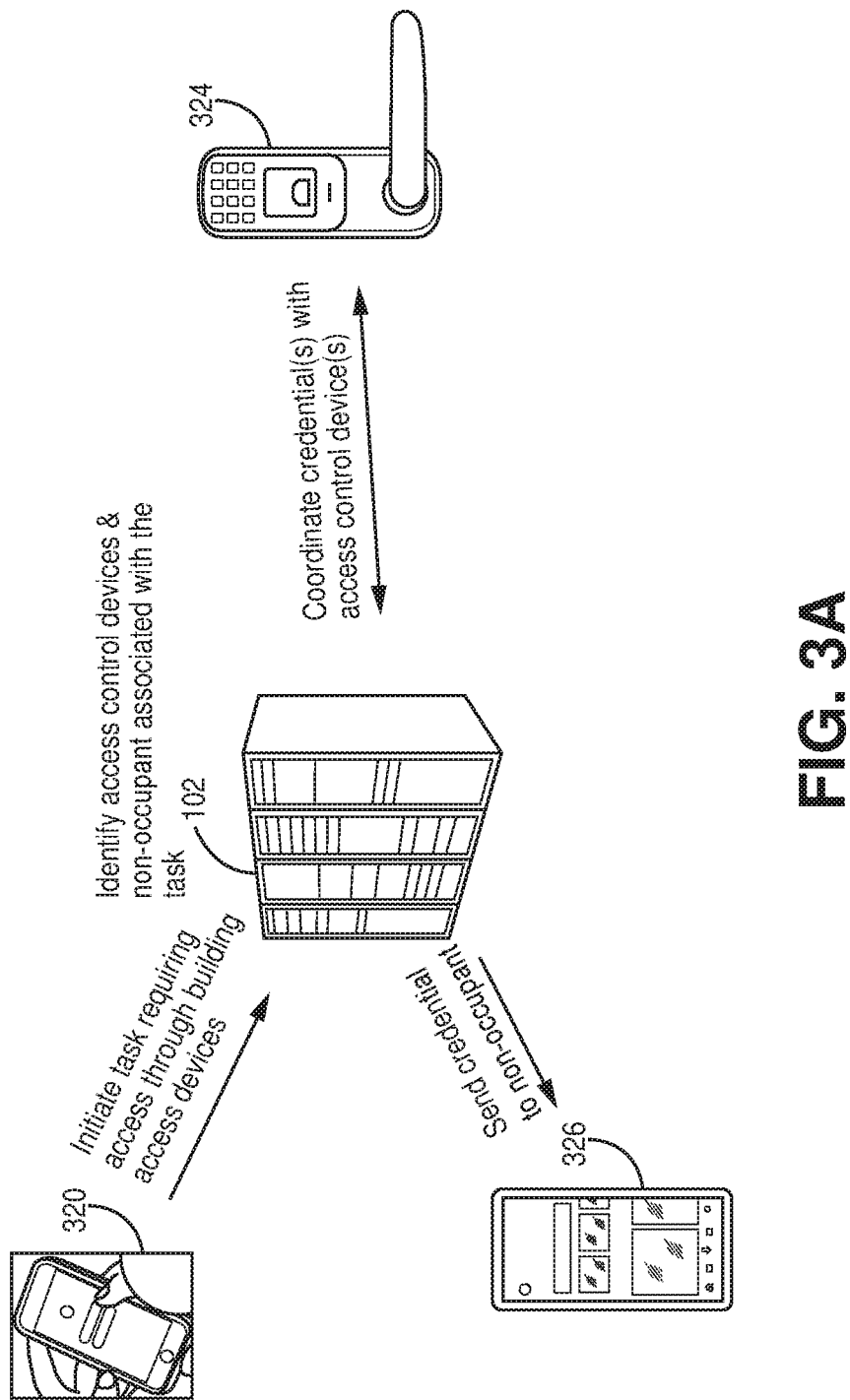
FIG. 3A is a block diagram of an example system for automatically distributing access to access control credentials.

Referring now to FIG. 3A, a block diagram of an example system 100 is illustrated interacting with a plurality of access control devices to automatically distribute access control credentials to non-occupant individuals. In an example, the backend server 102 can automatically identify and authorize access through one or more access control devices based on a task that has been created therein. FIG. 3A illustrates the backend server 102 in communication with an occupant or manager app 320 executing on an occupant or manager device, a non-occupant app 322 executing on a non-occupant device, and a plurality of access control devices 324. As discussed above, the occupant or manager app 320 can initiate a task in which access through one or more access control devices is needed to complete the task. The backend server 102 can automatically identify which one or more access control devices access is required to complete the task and coordinate with the corresponding one or more access control devices 324 to coordinate electronic access credentials therefore. The backend server 102 can then send the electronic access credentials for the one or more access control devices to the non-occupant individual (s) associated with the task for completing the task.

Figure 3B:
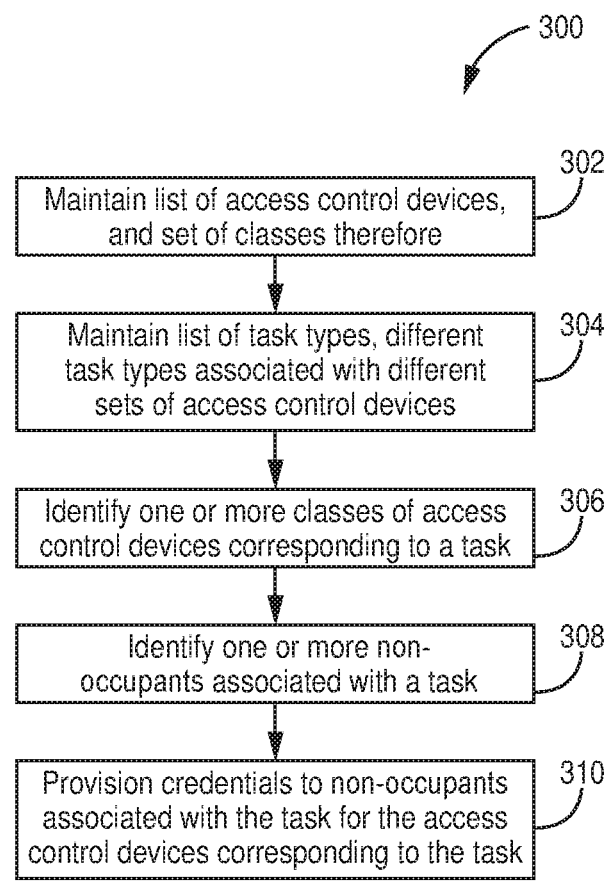
FIG. 3B is a flow diagram of an example method for managing a plurality of access control devices with the system of FIG. 3A.

FIG. 3B is a flow diagram of an example of such a process. To identify and authorize the access, the backend server 102 can maintain a list of all the access control devices for a building (block 302). The access control devices can be divided into multiple classes, each class corresponding to a type of access the access control device controls. Example classes can include exterior building access (e.g., access via an external person door or garage door), lobby access (e.g., access via the front door), shared space access (e.g., pool, fitness center, meeting room), inter-floor access (e.g., elevator and stairwell access), service area (e.g., service closets, utility room, basement, roof) and occupant unit. A given access control device can be included in one or more than one class. For example, an access control device for the front door can be included in both the lobby access class and the exterior building access class.

The backend server 102 can also maintain a list of the different types of tasks (block 304). Example types of tasks can include occupant unit access tasks, shared space access tasks, and general building access tasks. Each type of task can be associated with one or more classes of access control devices. For example, a general building access task can be associated with the exterior building access class. An occupant unit access task can be associated with the lobby access class, an occupant unit class, as well as an inter-floor access class, since access through each of these devices may be required to provide access to an occupant unit.

Upon creation of a task by an occupant (via an occupant app 104) or a manager (via a manager app), the occupant or manager can authorize access to their occupant unit or other space within the building as discussed above. In an example, an occupant's ability to authorize access is limited by the backend server 102, such that the occupant can authorize access through lobby access class devices, their occupant unit class, shared space class, and inter-floor access class to get to their occupant unit and shared spaces. In an example, an occupant cannot authorize access to occupant units other than their own unit and cannot authorize access to service area class access devices. In any case, in an example the occupant and/or management app can receive an input from an occupant during creation of the task that authorizes access through the desired access control devices.

In an alternative example, the backend server 102 can receive a general authorization for access, such that the general authorization will apply to multiple tasks. In this way, an occupant or building manager can authorize access for any of a certain type of tasks (e.g., package delivery) prior to creation of the task and without having to individually authorize the access during creation of the task. In some examples, the general authorization can be associated with a certain service entity (e.g., a package delivery service, a short stay rental service, or a cleaning service), such that general authorization is provided for all tasks in which the authorized service entity is completing the service. In such a case, the backend server 102 may provide a means such that the general access can be overruled during creation of a specific task.

In any case, after a task is created at the backend server 102, the backend server 102 can determine whether non-occupant access through access control devices has been authorized for the task. The authorization can be any authorized discussed herein, including authorization received during creation of the task or general authorization provided prior to creation of the task. The backend server 102 can then identify the classes of access control devices to which that type of task corresponds (block 306). If the task is of an occupant unit access type, the backend server 102 can provide access to the lobby class access control devices, the occupant unit access control device for the occupant unit associated with the occupant that created the task, and the inter-level access control devices for example.

The backend server 102 can also identify one or more non-occupants associated with the task (block 308). The task can be associated with one or more non-occupant accounts as discussed above to which the credentials for the identified access control devices is to be granted. The one or more non-occupant accounts can be indicated by the occupant or management during creation of the task, for example. The backend server 102 can maintain a list of all non-occupant accounts that can be granted access to the access control devices. During creation of a task by an occupant, the occupant app 104 can provide a list of available non-occupant accounts (e.g., cleaning companies, retail entities, moving companies, etc.) to select to complete the task (e.g., cleaning of an occupant unit). The occupant app 104 can then receive a selection of a non-occupant account to complete a task from an occupant and send an indication of the non-occupant account selected to complete the task to the backend server 102 along with the information regarding the task. In response to receiving the information on the task, the backend server 102 can authorize access for the individuals corresponding to the selected non-occupant, the backend server 102 can provide access to all the individuals associated with the non-occupant entity identified in the task. For example, if the task is for cleaning of an occupant unit, the non-occupant account associated therewith can be a cleaning company.

In an example, the non-occupant account can include an individual who purchased access to an occupant unit or shared space within the building. For example, an individual can purchase access to an occupant unit as a short stay rental (e.g., AirBnB). Prior to the individual purchasing the access, an occupant or manager that is renting the unit can, via their occupant or manager app, initiate a task for short stay rental of the corresponding occupant unit. The occupant or manager can initiate the task and indicate a non-occupant entity (e.g., AirBnB) that is implementing the short stay. If a manager is creating the task, the manager can also indicate which occupant unit the task corresponds to. If an occupant is creating the task, the backend server 102 can automatically associate the task with the occupant unit corresponding to the occupant profile, i.e., the occupant's unit as indicated in that occupant's profile with the system 100. In either case, the task is associated with a non-occupant entity and an occupant unit. This short stay task can be associated with the occupant unit class access device, exterior building class access devices, and inter-level access devices as necessary to grant access to the occupant's unit. The short stay task can also be associated with shared space class access devices to allow the short stay tenant access to the shared spaces within the building, such as a workout facility.

In another example, the manager can initiate a task for allowing non-occupants to purchase access to a shared space within the building. For example, a manager can initiate a task allowing non-occupants to purchase access to a workout facility in that building. Such a task can be associated with the exterior building class access devices and the access device providing access to the corresponding shared space (e.g., workout facility) within the building.

Once a short stay task or non-occupant access task is created, the system 100 can provide access credentials for the access devices corresponding to the task to the non-occupant individual in response to an indication that the non-occupant has purchased a short stay or access to a shared space. For example, an occupant unit can be listed on a short stay entity's website (e.g., AirBnB) or listed by the system 100 itself. Upon purchasing the occupant unit on the short stay entity's website or through system 100, the system 100 can receive an indication that the occupant unit has been purchased and an indication of the time period for which the unit has been purchased. The system 100 can also receive an indication of the non-occupant individual that has purchased the unit. The system 100 can then automatically provide this non-occupant individual access to the access control devices associated with the corresponding task.

To provide access to one or more access control devices, the backend server 102 can provide access credentials to the appropriate non-occupant individuals that correspond to the task (block 310). Any appropriate means of credentials can be used. One example means or providing credentials to a non-occupant individual is the temporary key process discussed above. In another example, the credentials include one or more codes sent to non-occupant individuals associated with the task for the access control devices through which access is authorized. The individual(s) can then type in the code to the access control devices to be granted access. In another example, the credentials can be one or more signals (e.g., Bluetooth) or images that are sent to a mobile device for the non-occupant (e.g., in the non-occupant app). The individual(s) can then present these signals or images to the one or more access control devices to which access has been granted. In some examples, the non-occupant individual can download and install the non-occupant app and provide information such that the backend server 102 can associate the non-occupant app with a non-occupant individual (e.g., associated with a service entity, or purchasing access to a short stay or shared space). In some examples, multiple different credentials can be sent to an individual for a given task, wherein different credentials are provided for different access control devices.

In some examples, the backend server 102 can also communicate with the access control devices corresponding to the task to provision, receive, or otherwise communicate with those devices to coordinate the credential that is or will be provided to the non-occupant individual for access through that access control device. The backend server 102 can be configured to interact with one or multiple different providers of electronically controlled access control devices, in order to coordinate the credentials.

Notably, the time in which the access control devices are identified, and/or the access credentials are distributed can be any appropriate time after the corresponding task is created. For example, a task for cleaning of an occupant unit can be created on a first day, but the actual cleaning of the unit may not occur for several days later. The backend server 102 can maintain the task, the associated access control devices, and the associated non-occupants for it for the several days after creation of the task. After an individual logged into the non-occupant account associated with the task selects the task to complete, for example on the day in which the cleaning is to be performed, the backend server 102 can provide the non-occupant app with the credentials for the access control devices associated with the task.

In an example, the task can be created via an API provided between the backend server 102 and a third-part system. Example third-party systems include short stay service entities (e.g., AirBnB), smart lock management systems, retail entities (e.g., Amazon), and package delivery entities (e.g., UPS, FedEx). The third-party system, for example, in response to a booking or other ordering of a service can send information to the backend server 102 for a service (e.g., package delivery, short stay, etc.) that corresponds to an occupant unit within the building for system 100. In response to receiving the information, the backend server 102 can create a task for the service and/or for authorized entry corresponding to the service. In an example, the information received by the backend server 102 via the API from the third-party system can include a non-occupant to associate with the task. For example, for a short stay, the backend server 102 can receive information corresponding to a non-occupant that purchased the short stay. As another example, information from Amazon can indicate a non-occupant that will deliver the item purchased. In any case, the backend server 102 can associate a non-occupant account for that non-occupant with the task and automatically distribute access credentials for that task as discussed above. If the non-occupant does not have an existing non-occupant account in the system 100, the backend server 102 can create a new non-occupant account and send log-in information to the non-occupant for the account. The non-occupant can then install a non-occupant app for the system 100 and log-in with the log-in information to receive the access credential as discussed above. In an example, the backend server 102 can receive an indication of whether general authorized access for the third-party entities has been granted from the occupant and/or manager corresponding to the access control unit in which the access control credentials are to be distributed. If general access has been authorized by the occupant/manager, then the backend server 102 can automatically distribute the corresponding access credentials without further authorization from the occupant or manager. If general access has not been authorized, the backend server 102 can withhold access credentials until if and when authorization is received.

The backend server 102 can automatically distribute the access control credentials in this way for multiple tasks and multiple occupants concurrently. Thus, the access control credentials to complete a task can be distributed without the occupant having to manually and individually authorize each specific individual and each specific access control device as in previous systems.

Figure 4:
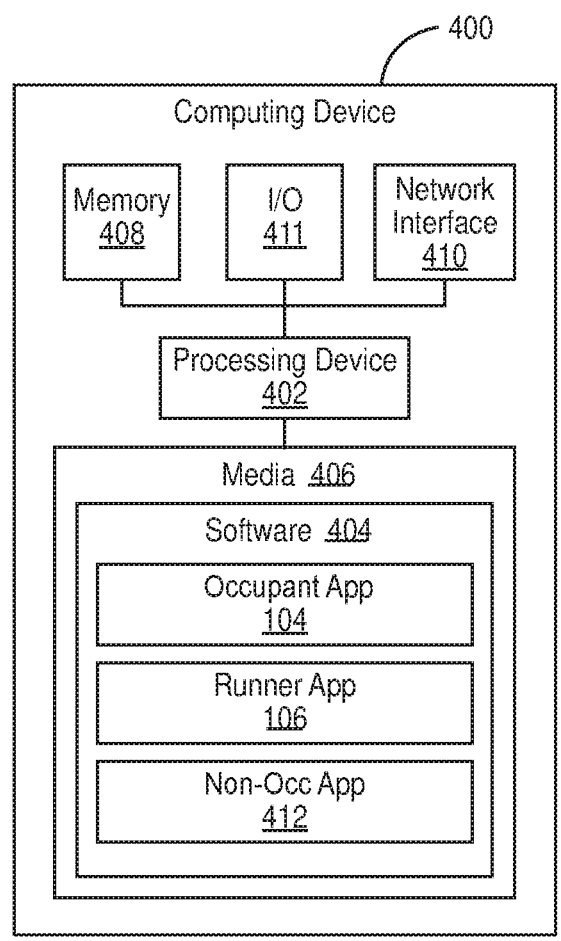
FIG. 4 is a block diagram of an example computing device including an occupant app, runner app, or non-occupant app thereon.

FIG. 4 is a block diagram of an example computing device 400 including a runner app, occupant app, or non-occupant app thereon. Each runner app 106, occupant app 104, and non-occupant app described herein is a software module executing on a respective computing (e.g., mobile) device 400. Each respective computing device 400 includes one or more processing devices 402 for executing instructions 404. The one or more processing devices 402 can include a general-purpose processor or a special purpose processor. The instructions 404 are stored (or otherwise embodied) on or in an appropriate storage medium 406 or media (such a hard drive or other non-volatile storage) from which the instructions 404 are readable by the processing device(s) for execution thereby. The one or more processing devices 402 are coupled to the storage medium or media to access the instructions therefrom. The instructions 404 include a runner app 106, occupant app 104, non-occupant app. All three of the runner app 106, occupant app 104, non-occupant app are shown in the single computing device 400, however, only one of the runner app 106, occupant app 104, non-occupant app would likely be installed on a respective computing device, based on who is using that computing device (e.g., runner, occupant, non-occupant).

The computing device 400 also includes memory 408 that is coupled to the processing device(s) 402 for storing instructions (and related data) during execution by the processing device(s) 402. Memory comprises, in one implementation, any suitable form of random-access memory (RAM) now known or later developed, such as dynamic random-access memory (DRAM). In other implementations, other types of memory are used. The computing device 400 also includes at least one network interface 410 (e.g., a wireless cellular interface, a wi-fi interface) for communicatively coupling to other computing devices over a network. The computing device 400 can also include one or more human interface devices (I/O) 411. The human interface can include any suitable interface that can provide information to and/or receive input from a human, including a touchscreen, a microphone, a speaker, a heads-up display, or a camera.

In an example, the instructions or a portion thereof can be stored or otherwise embodied on a computer readable medium that is distinct from any device and can be loaded onto a computing device 400. The computer readable media on which the instructions are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

The functionality of the occupant app 104, runner app 106, and/or non-occupant app 412 can also be implemented via a web browser. That is, instead of interacting with a runner app 106, occupant app 104, and/or non-occupant app 412, the runner or occupant respectively can interact with a web browser connected to the appropriate address. The functionality provided to the runner, occupant, or non-occupant via the web browser can be the same as described herein for the runner app 106, occupant app 104, and non-occupant app 412.

Figure 5:
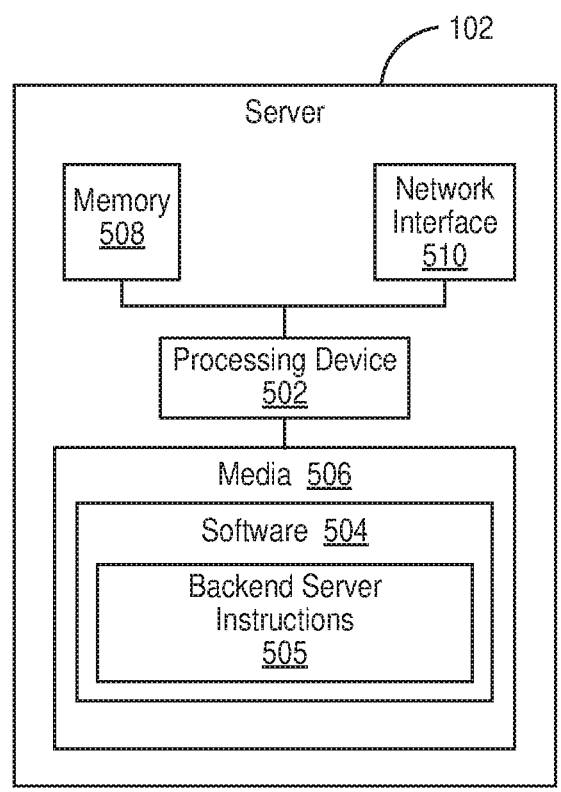
FIG. 5 is a block diagram of an example backend server.

FIG. 5 is a block diagram of an example backend server 102. The backend server 102 includes one or more processing devices 502 for executing instructions 504. The one or more processing devices 502 can include a general-purpose processor or a special purpose processor. The instructions 504 are stored (or otherwise embodied) on or in an appropriate storage medium 506 or media (such a hard drive or other non-volatile storage) from which the instructions 504 are readable by the processing device(s) for execution thereby. The one or more processing devices 502 are coupled to the storage medium or media to access the instructions therefrom. The instructions 504 include backend server instructions 505 which, when executed by the processing device(s) 502, cause the server 102 to perform the actions of the backend server 102 described herein.

The backend server 102 also includes memory 508 that is coupled to the processing device(s) 502 for storing instructions (and related data) during execution by the processing device(s) 502. Memory comprises, in one implementation, any suitable form of random-access memory (RAM) now known or later developed, such as dynamic random-access memory (DRAM). In other implementations, other types of memory are used. The backend server 102 also includes at least one network interface 510 (e.g., a wireless cellular interface, a wi-fi interface) for communicatively coupling to other computing devices over a network.

In an example, the instructions or a portion thereof can be stored or otherwise embodied on a computer readable medium that is distinct from any device and can be loaded onto a backend server 102. The computer readable media on which the instructions are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

Although a single device is shown in this example for the backend server 102, the backend server 102 can be implemented with multiple computing devices (e.g., multiple servers). The multiple computing devices can be co-located and/or one or more of the multiple computing devices can be disparately located.

What is claimed is:

1. A method for managing a plurality of access control devices, the method comprising:
   providing, at a backend server, a plurality of tasks for selection by a plurality of occupants of a multi-unit building;
   providing a plurality of occupant apps for the plurality of occupants, each occupant app configured to:
      receive a selection of a selected task of the plurality of tasks from an occupant of the plurality of occupants; and
      in response to the selection, send a request to schedule the selected task to the backend server:
   each of the plurality of tasks associated with one or more of a plurality, of non-occupant accounts to complete the corresponding task;
   each of at least a subset of the plurality of tasks associated with one or more of the plurality of access control devices that the one or more non-occupant accounts are granted access to in order to complete corresponding task;
   at a backend server, receiving, from a first occupant app of the plurality of occupant apps an indication that general authorized access is allowed for tasks assigned to a first non-occupant account:
   at the backend server, receiving, from the first occupant app, an indication that general authorized access is not allowed for tasks assigned to a second non-occupant account;
   at a backend server, receiving a request to schedule a first task of the at least a subset of tasks from the first occupant app of the plurality of apps;
   if the first task is associated with the first non-occupant account:
      at the backend server, identifying one or more access control devices that the first non-occupant account is to be granted credentials in order to complete the first task;
      at the backend server, provisioning credentials for the one or more access control devices associated with the first task to the first non-occupant account based on the general authorized access without further authorization from the first occupant app;
   if the first task is associated with the second non-occupant account, restricting access to the one or more access control devices until further authorization is received from the first occupant app;
at the backend server, receiving a request to schedule a second task of the at least a subset of tasks from a second occupant app of the plurality of occupant apps:
at the backend server, identifying one or more access control devices that a non-occupant account is to be granted credentials in order to complete the second task; and
at the backend server, provisioning credentials for the one or more access control devices associated with the second task to the non-occupant account selected to complete the second task.

2. The method of claim 1, wherein identifying one or more access control devices includes identifying the one or more access control devices based on type of task, wherein a first type of task provides access to a first set of one or more access control devices and a second task provides access to a second set of one or more access control devices, the second set different than the first set.

3. The method of claim 2, wherein the type of tasks include one or more of occupant unit access, lobby access, inter-level access, and a building shared space access.

4. The method of claim 1, wherein each of the plurality of non-occupant accounts corresponds to one of a service entity to complete the task, an individual purchasing a short stay, and an individual purchasing access to a shared space within the building.

5. The method of claim 1, wherein the plurality of tasks include one or more of a short stay task indicating that a unit is available for short stay rental, and a shared space rental task indicating that access to a shared space in the building is available to be rented to a non-occupant.

6. The method of claim 1, wherein identifying one or more access control devices includes identifying the one or more access control devices based on an occupant profile associated with the task, wherein the one or more access control devices include an access control device for an occupant unit identified in the occupant profile.

7. A program product for managing a plurality of access control devices, the program product comprising:
a non-transitory processor readable medium having software stored thereon, the software, when executed by one or more processing devices, configured to:
provide a plurality of tasks for selection by a plurality of occupants of a multi-unit building;
provide a plurality of occupant apps for the plurality of occupants, each occupant app configured to:
receive a selection of a selected task of the plurality of tasks from an occupant of the plurality of occupants; and
in response to the selection, send a request to s selected task to the backend server;
each of the plurality of tasks associated with one or more of a plurality of non-occupant accounts to complete the corresponding task;
each of at least a subset of the plurality of tasks associated with one or more of the plurality of access control devices that one or more non-occupant accounts are granted access to in order to complete corresponding task;
receive, from a first occupant app of the plurality of occupant apps, an indication that general authorized access is allowed for tasks assigned to a first non-occupant, account;
receive, from the first occupant app, an indication that general authorized access is not allowed for tasks assigned to a second non-occupant account;
receive a request to schedule a first task of the at least a subset of tasks from the first occupant app of the plurality of apps;
if the first task is associated with the first non-occupant account:
identify one or more access control devices that the first non-occupant account is to be granted credentials in order to complete the first task; and
provision credentials for the one or more access control devices associated with the first task to the first non-occupant account based on general authorized access without further authorization from the first occupant app;
if the first task is associated with the second non-occupant account, at the backend server restricting access to the one or more access control devices until further authorization is received from the first occupant app;
receive a request to schedule a second task of the at least a subset of tasks from a second occupant app of the plurality of occupant apps;
identify one or more access control devices that a non-occupant account is to be granted credentials in order to complete the second task; and
provision credentials for the one or more access control devices associated with the second task to the non-occupant account selected to complete the second task.

8. The program product of claim 7, wherein identify one or more access control devices includes identify the one or more access control devices based on type of task, wherein a first type of task provides access to a first set of one or more access control devices and a second task provides access to a second set of one or more access control devices, the second set different than the first set.

9. The program product of claim 8, wherein the type of tasks include one or more of occupant unit access, external building access, shared space access, lobby access, and inter-level access.

10. The program product of claim 7, wherein identify one or more access control devices includes identify the one or more access control devices based on an occupant profile associated with the task, wherein the one or more access control devices include an access control device for an occupant unit identified in the occupant profile.

11. A device in a system for managing a plurality of access control devices, the device comprising:
one or more processing devices;
a processor readable medium coupled to the one or more processing devices, the processor readable medium having software stored thereon, the software, when executed by one or more processing devices, configured to:
provide a plurality of tasks for selection by a plurality of occupants of a multi-unit building;
provide a plurality of occupant apps for the plurality of occupants, each occupant app configured to:
receive a selection of a selected task of the plurality of tasks from an occupant of the plurality of occupants; and
in response to the selection, send a request to schedule the selected task to the backend server;

each the plurality of tasks associated with one or more of a plurality of non-occupant accounts to complete the corresponding task;

each of at least a subset of the plurality of tasks associated with one or more of the plurality of access control devices that the one or more non-occupant accounts are granted access to in order to complete corresponding task;

receive, from a first occupant app of the plurality of occupant apps, an indication that general authorized access is allowed for tasks assigned to a first non-occupant account;

receive from the first occupant app, an indication that general authorized access is not allowed for tasks assigned to a second non-occupant account;

receive a request to schedule a first task of the at least a subset of tasks from the first occupant app of the plurality of apps;

if the first task is associated with the first non-occupant account, identify one or more access control devices that the first non-occupant account is to be granted credentials in order to complete the first task; and provision credentials for the one or more access control devices associated with the first task to the first non-occupant account based on general authorized access without further authorization from the first occupant app;

if the first task is associated with the second non-occupant account, at the backend server, restricting access to the one or more access control devices until further authorization is received from the first occupant app;

receive a request to schedule a second task of the at least a subset of tasks from a second occupant app of the plurality of occupant apps;

identify one or more access control devices that a non-occupant account is to be granted credentials in order to complete the second task; and provision credentials for the one or more access control devices associated with the second task to the non-occupant account selected to complete the second task.

12. The device of claim 11, wherein identify one or more access control devices includes identify the one or more access control devices based on type of task, wherein a first type of task provides access to a first set of one or more access control devices and a second task provides access to a second set of one or more access control devices, the second set different than the first set.

13. The device of claim 12, wherein the type of tasks include one or more of occupant unit access, external building access, shared space access, lobby access, and inter-level access.

14. The device of claim 11, wherein identify one or more access control devices includes identify the one or more access control devices based on an occupant profile associated with the task, wherein the one or more access control devices include an access control device for an occupant unit identified in the occupant profile.

\* \* \* \* \*